United States Patent Office 3,182,704
Patented May 11, 1965

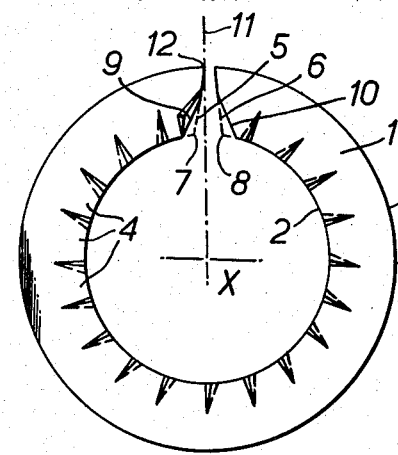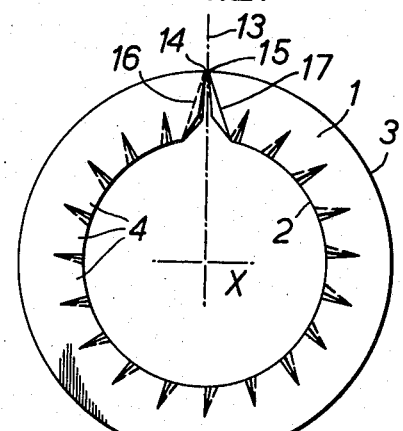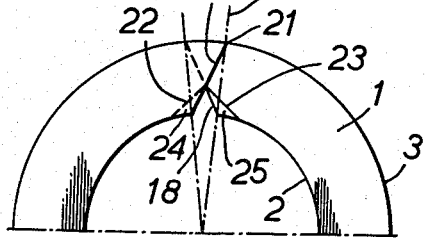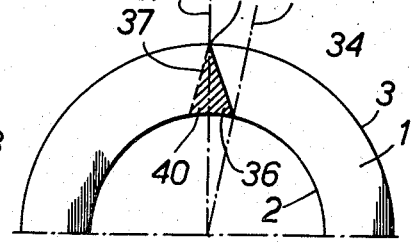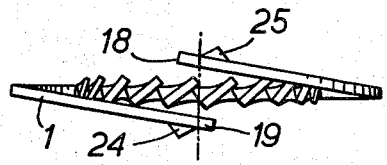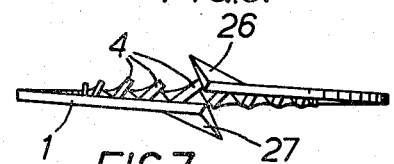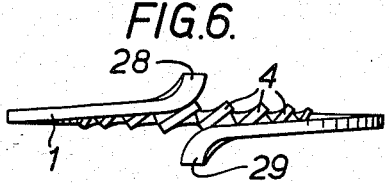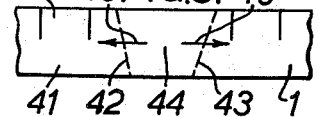

3,182,704
HELICAL LOCKING WASHERS
Ernst Jordan, Leinpfad 17, Hamburg 39, Germany
Filed May 31, 1961, Ser. No. 113,849
Claims priority, application Germany, July 1, 1960,
J 18,380
3 Claims. (Cl. 151—36)

This invention relates to helical locking washers.

It is known to provide a helical locking washer with a number of overlapping teeth arranged around the inner periphery and formed so that their inner edges are inclined to the helix of the washer. It is also known to provide helical washers with end teeth having radial biting edges extending across the full width of the washer. Such washers are frequently made by appropriately forming strip material and thereafter coiling into helical form.

Known washers have the disadvantage that, in use, the forces acting on the radial biting edges tend to make the washer spread radially. Further, because the biting edges of the end teeth extend across the full width of the washer there is a tendency for imperfect contact to be made between the washer and its adjacent components. This imperfect contact may also have an effect on the washer spreading radially and it is an object of my invention to overcome these disadvantages.

According to this invention I provide a locking washer comprising a helical body, a number of overlapping teeth formed on the inner periphery of the body, the said teeth being inclined to the body, and an end tooth on each end of the body, each end tooth having a non-radial biting edge and being inclined to the body so that the end teeth project in opposite directions away from each other.

One form of washer according to my invention comprises a body having a single helical convolution, a number of overlapping teeth formed on the inner periphery of the body and inclined to the helix, and a triangular end tooth formed on each end of the body about a non-radial line, the non-radial lines for the end teeth being divergent in plan with respect to the centre of the washer and each line constituting one side of a triangular end tooth, the end teeth being inclined to the body and projecting outwardly in opposite directions away from each other.

Another form of washer according to my invention comprises a helical body having overlapping end portions which terminate in non-radial lines, the extent of the overlap being such that the non-radial lines intersect between the inner and outer peripheries of the body, and an end tooth on each end of the body formed from those end portons inwardly of the intersection of the non-radial lines and inclined to the body and projecting outwardly in opposite directions away from each other.

If desired the end teeth may be reinforced by making them of greater thickness than the body of the washer.

Various forms of locking washer in accordance with my invention will now be described in detail, by way of example, with reference to the accompanying drawings in which:

FIGURE 1 is a plan view of one form of locking washer;

FIGURE 2 is a plan view of another form of locking washer;

FIGURE 3 is a plan view of a further form of locking washer;

FIGURE 4 is a side view of FIGURE 3;

FIGURES 5 and 6 are similar views to FIGURE 4 showing differently shaped end teeth;

FIGURE 7 shows a truncated triangular end tooth;

FIGURE 8 is a form of locking washer with overlapping ends cut at different angles, and FIGURE 9 shows a strip of metal from which a washer is formed.

Referring to the drawings, the locking washer has a body 1 in the form of a single helical convolution having inner and outer peripheries designated 2 and 3 respectively. The inner periphery has a number of teeth 4 pressed out of the plane of the body so that they overlap slightly as shown in FIGURES 4 and 6.

Ends 5 and 6 of the washer are shaped, as indicated by dotted non-radial lines in FIGURE 1 which are divergent with respect to the centre X of the washer. Inner end portions 7 and 8 are bent out of the plane of the body along lines 9 and 10 respectively, and in the sense of the helix, to form triangular teeth projecting in opposite directions. As shown in FIGURE 1 the lines 9 and 10 lead from points on the inner periphery to points intermediate the width of the body.

In FIGURE 2 another form of locking washer is shown in which although the ends (corresponding to 5 and 6 in FIGURE 1) are cut along radial line 13, end portions 14 and 15 are bent along non-radial lines 16 and 17 to form triangular end teeth projecting in opposite directions in the sense of the helix.

In FIGURES 3 and 4 a further form of locking washer is shown in which the ends 18 and 19 of the body overlap along the outer periphery. In this form, the non-radial lines 18 and 19 intersect intermediate the width of the body and, in a manner similar to that already described, triangular end teeth 24 and 25 are formed along lines 22 and 23 respectively. As shown in FIGURE 3 the end teeth 24 and 25 are formed from those parts of the body between the inner periphery 2 and the point represented by the intersection of non-radial lines 18 and 19. In the form shown in FIGURES 3 and 4 the end lines 18 and 19 may be shaped so that the biting edges of the end teeth are radial.

FIGURE 5 shows a washer having overlapping ends 26 and 27 which form the end teeth. In use, such a washer is spread radially as the backs of the teeth 26 and 27 slide together and co-act under pressure.

FIGURE 6 shows biting edges 28 and 29 of the end teeth which are of greater thickness than the washer body. This is a particularly strong form of washer and further reference will be made to this feature when considering FIGURE 9.

FIGURE 7 shows a development of one end of a locking washer having an end tooth 30 bent along a line 31 which is inclined at approximately 35° to radial line 32. Inner corner 50 is shown cut away so that biting edge 33 is formed and lies within that annular area from which inner peripheral teeth are formed. It will be clear from FIGURE 7 that by varying the angle between non-radial line 31 and radial line 32 (and by cutting away the inner corner 50 parallel to line 31 at whatever angle is selected) the angles between line 31 and the sides of the truncated end tooth may be made equal or unequal. For example, if angle "a" is 45° the sides of the truncated triangle and the base angles will be equal. It is preferred, however, to make the angle less than 45° so that side 51 of the end tooth is shorter than side 52.

FIGURE 8 shows a form of locking washer with overlapping ends which are cut at different angles and the overlapping area is indicated in the drawing by the hatched lines. In FIGURE 8 non-radial end lines 34 and 37 intersect at a point 39 on the outer periphery 3 as shown. Lines corresponding to end lines 34 and 37 but on the other end portions form bending lines for the formation of end teeth. The actual position of the bending lines 34 and 37 may be varied so that the biting edges of the end teeth do not extend beyond the annular region containing the inner peripheral teeth.

FIGURE 9 shows adjacent ends 42 and 43 of two locking washers before they are cut from a metal strip 41. To produce end teeth which are thicker than the locking washer body the metal between dotted lines 42 and 43 is "upset" in the direction of the arrows 45 and 46 and thereafter any unwanted metal between lines 42 and 43 is removed when appropriate washer lengths are cut from the strip.

In the various forms of washer described above I prefer to make the height of the end teeth slightly greater than that of the peripheral teeth. Locking washers made in accordance with this invention having overlapping ends possess the advantage that interlinking in packings is avoided which enables such washers to be fitted and used very readily.

What I claim is:

1. A locking washer comprising a helical body having partially overlapping end portions which terminate in straight non-radial edges, the extent of the overlap being such that a projection of the non-radial edges intersects between the inner and outer peripheries of the body thereby defining overlapping sections of said end portions, respectively, adjacent the outer periphery of said body and non-overlapping sections of said end portions, respectively, adjacent the inner periphery of said body, and two end teeth bent from the non-overlapping sections of said end portions respectively thereby defining non-radial bend lines, said teeth being inclined to the body and projecting outwardly in opposite directions away from each other, said teeth being the furthest axially extending portions of said body, said bend lines diverging inwardly from an apex intermediate said peripheries.

2. A locking washer according to claim 1 in which said teeth are triangular and in which the point of the projection of intersection of the non-radial bend lines is such that said triangular end teeth have a base length, adjacent the body, of ⅓ of the width of the body measured along said non-radial bend lines.

3. A locking washer according to claim 1 in which said teeth are triangular and in which the sides of said triangular end teeth are substantially equal.

References Cited by the Examiner
UNITED STATES PATENTS

| | | | |
|---|---|---|---|
| 1,963,027 | 6/34 | Olson | 151—36 |
| 1,966,427 | 7/34 | Berge | 151—36 |
| 2,313,658 | 3/43 | McGrew | 151—36 |
| 3,097,679 | 7/63 | Jordan | 151—36 |

FOREIGN PATENTS

| | | |
|---|---|---|
| 789,519 | 4/35 | France. |
| 918,592 | 10/46 | France. |
| 699,637 | 11/40 | Germany. |

EDWARD C. ALLEN, *Primary Examiner.*

CARL W. TOMLIN, *Examiner.*